Patented Nov. 18, 1952

2,618,660

UNITED STATES PATENT OFFICE 2,618,660

CONTROLLED OXIDATION OF ALCOHOLS TO ALDEHYDES USING SULFUR COMPOUNDS

Willard A. Payne and Walter E. Vail, Charleston, W. Va., assignors to E. I. du Pont de Nemours & Company, Wilmington, Del., a corporation of Delaware No Drawing. Application May 25, 1949, Serial No. 95,368

5 Claims. (Cl. 260—603)

This invention relates to a process for the catalytic conversion of aliphatic alcohols to corresponding aldehydes and more specifically to the conversion with oxygen of methanol to formaldehyde in the presence of silver as the conversion catalyst.

The extensive progress made over the recent years in the manufacture of aldehydes from alcohols has been due largely to the use of efficient catalysts in conjunction with improved methods, materials of design and engineering economics attending large scale manufacture. There are two general classes of catalysts used for this manufacture, each producing a distinctive type of reaction and each requiring specific reaction conditions, that are exemplified by a silver catalyst and a metal oxide catalyst. Conversion of an alcohol to an aldehyde by a silver gauze catalyst results chemically in oxidation and dehydrogenation of the alcohol to the aldehyde, as a consequence of which there are produced with the formaldehyde considerable amounts of hydrogen and also, as this catalyst does not convert all of the methanol to formaldehyde, either by oxidation or dehydrogenation, appreciable amounts of unconverted alcohols. The metal oxide catalyst, on the other hand, also converts alcohols to aldehydes by a reaction that is essentially one of oxidation and in contrast to the silver catalyst, converts the alcohol to the aldehyde solely by oxidation, leaving substantially no unconverted alcohol in the products of the reaction.

The invention of the instant case is directed principally to reactions for the preparation of aldehydes from alcohols, in which a silver catalyst is employed, and to an improvement in the operation of such a process. According to the fact, however, that aldehydes can be prepared with considerable efficiency by a combination of both types of reactions in which the alcohol is oxidized and dehydrogenated over the silver catalyst and the gaseous mixture from that reaction passed over a metal oxide catalyst to oxidize the unconverted methanol in the mixture, the invention of the instant case is applicable to the combined process also.

An object of the present invention is to provide a process wherein alcohols are oxidized to aldehydes under conditions in which by-product formation is suppressed. Another object is to provide a process for the catalytic oxidation of methanol to formaldehyde in which by-product formation is suppressed by conducting the oxidation and dehydrogenation reactions in the presence of sulfur. Still another object is to provide a process for the oxidation of methanol to formaldehyde by passing a mixture of methanol and critical amounts of a sulfur compound over a silver catalyst at formaldehyde forming temperatures. Other objects and advantages of the invention will hereinafter appear.

The invention is conducted in accord with its broadest aspects by passing a vaporized lower molecular weight aliphatic alcohol, such, for example, as methanol, ethanol, normal or isopropanol or a butanol, in the presence of an oxidizing gas containing oxygen, air, air diluted with an inert gas or air fortified with oxygen, into contact under carefully controlled known conditions with a silver catalyst in any suitable form, such as particles of metallic silver, silver gauze, supported massive silver and the like, by-product formation being suppressed by the presence of sulfur. The invention stems from the suppression of by-product formation by the presence of sulfur during the oxidation and dehydrogenation of the alcohol. All other conditions for the reaction with respect to temperature (300 to 750° C.), pressure (atmospheric or above), oxidizing gas to methanol ratio (0.5:1 to 2:1), steam concentration, gas velocities and other reaction conditions used are the conditions of the prior art. If, when operating the process under such conditions, there is present, based on the weight of alcohol charged into the reaction, more than 5 parts per million of sulfur up to about 100 parts per million of sulfur and preferably between 20 and 30 parts per million, suppression of by-product formation is realized (parts are by wgt./million parts of alcohol).

The sulfur compounds that may be used to suppress by-product formation include organic sulfur containing compounds such, for example, as carbon disulfide; the alkyl sulfides, e. g. methyl sulfide, ethyl sulfide etc.; the mercaptans e. g. methyl mercaptan, ethyl mercaptan etc., allyl sulfide and other unsaturated alkyl, aryl, aralkyl cyclic or alicyclic sulfides or mercaptans and in fact any compound having the formula RSR in which the R groups are similar or dissimilar and represent hydrogen, alkyl, aryl, and/or aralkyl saturated or unsaturated groups. These sulfur compounds may be introduced into the conversion zone by solution in the alcohol and vaporizing them with the alcohol prior to passing the mixture over the catalyst. The sulfur compounds may be separately vaporized and passed as a separate stream into the vaporized alcohol stream or the sulfur compounds may be introduced with the steam into the reaction zone.

The examples illustrate embodiments of the invention in which parts are by weight unless otherwise indicated.

*Example 1.*—100 lbs. of substantially anhydrous methanol containing substantially no sulfur was vaporized with 125 lbs. (dry basis) of primary air and 11 lbs. of steam added. The mixture was heated above 50° C. and then passed over 75 sheets of 20 U. S. standard mesh silver gauze catalyst which has been previously preheated to about 300° C. to insure light-off (initiation of the reaction). Approximately 67.4 lbs. of the methanol was converted to formaldehyde with about 5.5 lbs. to by-product oxides of carbon and 27.1 lbs. of unconverted methanol.

*Example 2.*—The process of Example 1 was repeated using 100 lbs. of anhydrous methanol containing about 6 parts of sulfur, as $CS_2$, per million parts of methanol, all other conditions being the same. In this process by-product formation was reduced to 4.5 lbs.

*Example 3.*—The process of Example 1 was repeated using 100 lbs. of anhydrous methanol containing 20 parts per million of organic sulfur and the reaction continued under identical conditions with the process of that example. The by-product formation, in accord with this example, decreased to approximately 3.5 lbs., the conversion of methanol to formaldehyde remaining substantially constant.

*Example 4.*—The process of Example 3 was continued but the sulfur content of the methanol gradually reduced to 0 part per million per part of the anhydrous methanol. The advantageous influence of higher sulfur content was not permanent because the by-product level reverted to a normal of about 5.5% within a few hours after the return to a methanol feed of no sulfur.

*Example 5.*—The process substantially in accord with Example 1 was carried out using 100 lbs. of anhydrous methanol containing 10 parts per million of sulfur as $CS_2$. In this reaction substantially 67 lbs. of methanol was converted to formaldehyde with but 4.3 lbs. of by-product oxides of carbon. By increasing the sulfur content of the methanol feed to 25 parts per million of sulfur and repeating the process, by-product formation was reduced to 3%.

*Example 6.*—100 lbs. of anhydrous methanol containing 25 parts per million of sulfur as $CS_2$ was vaporized with 125 lbs. (dry basis) of primary air and 11 lbs. of steam added. The mixture was heated to above 50° C. and then passed over 75 sheets of 20 U. S. standard mesh silver gauze catalyst which had been previously preheated to about 300° C. to insure rapid initiation of the reaction.

The effluent from the silver gauze reaction was mixed with 160 lbs. of secondary air and the mixture then passed over a catalyst consisting essentially of molybdic oxide plus iron oxide which was maintained at a temperature between 285 and 350° C. by an external heat exchanger. The quantity of secondary air added plus the initial primary air (125 plus 160 lbs.) represents an air to methanol ratio, based on the initial 100 lbs. of methanol, of 2.85:1. The unconverted methanol from the silver gauze convertor was essentially cleaned up over the metal oxide catalyst so that a methanol-free formaldehyde was recovered in a subsequent scrubbing operation. Based on the over-all methanol balance the composition of the effluent gases represented a conversion of 91.1 lbs. of the initial 100 lbs. of methanol to formaldehyde and 6.1 lbs. to by-products with 1.6 lbs. of unconverted methanol.

*Example 7.*—The process of Example 6 was repeated using 100 lbs. of substantially anhydrous methanol containing no sulfur. In accord with this process the over-all methanol balance represented a conversion of 89 lbs. of the initial 100 lbs. of methanol to formaldehyde, 9.0 lbs. to by-products with 2 lbs. of unconverted methanol.

*Example 8.*—100 lbs. of anhydrous methanol containing 35 parts per million of sulfur, as $CS_2$, was vaporized with 125 lbs. of primary dry air and 11 lbs. of steam added. The mixture, after heating to 50° C., was passed over 104 sheets of a silver gauze catalyst of 20 U. S. standard mesh size. The reaction was retained within the catalyst bed and by the addition of more air it was possible to increase conversion, with the greater amount of catalyst and sulfur without increasing by-products, to 70.8% formaldehyde and 4.7% by-products at 24.5% methanol leakage; whereas with 104 sheets of silver catalyst and normal air introduction, but without sulfur addition, conversions were 65.3% to formaldehyde and 5.4% to by-products with 29.3% methanol leakage.

From the examples it is apparent that the presence of sulfur not only lowers the by-product formation when methanol is oxidized over a silver catalyst but also lowers the over-all by-product formation when the methanol is oxidized over a silver catalyst and the unconverted methanol from that reaction converted to formaldehyde over a metal oxide catalyst.

It has been found that there is an optimum sulfur concentration in the methanol feed for minimum by-product formation and that this concentration is correlated with the depth of the silver catalyst bed. When a bed contains 75 sheets of silver gauze and there is more than 20 parts per million of sulfur in the feed, the reaction is forced down to the catalyst supporting plate (the direction of gas flow being from top to bottom of the bed) and this reduces the over-all effect of the sulfur. On the other hand, an increase in the bed to 160 sheets of silver gauze permits the sulfur concentration to be increased. With more than 50 parts per million of sulfur, however, by-product formation likewise increases over that obtained with 20 parts per million of sulfur and 75 sheets of silver gauze. Data illustrating this effect is tabulated in the table.

*Table*

| Sheets of Ag Catalyst | 75 | | 160 | | |
|---|---|---|---|---|---|
| P. p. m. Sulfur (as $CS_2$) | 0 | 20 | 0 | 25 | 50 |
| Percent By-Products | 5.5 | 3.5 | 5.2 | 4.2 | 4.1 |
| Percent Formaldehyde | 69.7 | 68.0 | 67.3 | 68.0 | 64.9 |
| Percent Methanol Leakage | 24.8 | 28.5 | 27.5 | 27.8 | 31.0 |

The metal oxide catalysts generally known for the oxidation of methanol to formaldehyde are used for the two step oxidation reaction. As specific examples of these catalysts are included vanadium and molybdenum, used separated or together. Also suitable for this purpose are the metal salt catalysts including the molybdenum promoted with manganese, magnesium, cadmium, or an alkaline earth metal.

The actual effect of the sulfur on the catalyst or on the reaction of methanol to formaldehyde is not understood but it may well be there is a partial poisoning of the silver by the sulfur, on the one hand, and also a partial poisoning of the metal oxide by the sulfur on the other, which makes these catalysts less active for the by-product reactions.

The by-products produced in the oxidation of methanol, either by silver gauze catalyst or metal oxide catalyst, include oxides of carbon and other gases, methyl formate and other organic derivatives which are undesirable contaminants. Their production, accordingly, is a loss of valuable raw material and when production units produce millions of pounds of formaldehyde per week, the economical value of suppressing their formation is self-evident.

We claim:

1. In a process for the production of an aldehyde by the treatment of an alcohol with air in the presence of a silver catalyst, the step which comprises suppressing the formation of by-products by conducting the alcohol to aldehyde reaction in the presence of from 5 to 100 parts of sulfur per million parts of alcohol, the sulfur being present in a compound of the group consisting of carbon disulfide, saturated alkyl sulfides, mercaptans and unsaturated alkyl, aryl, aralkyl, cyclic and alicyclic sulfides.

2. In a process for the production of formaldehyde by the oxidation and dehydrogenation of methanol with air and a silver catalyst to a gaseous mixture containing formaldehyde and unconverted methanol and the subsequent oxidation of the methanol in said gaseous mixture by a metal oxide catalyst, the step which comprises suppressing the formation of by-products during both reactions by sulfur introduced into the reactions to the extent of 5 to 100 parts per million parts of methanol, the sulfur being present in a compound of the group consisting of carbon disulfide, saturated alkyl sulfides, mercaptans and unsaturated alkyl, aryl, aralkyl, cyclic and alicyclic sulfides.

3. In a process for the production of formaldehyde by the treatment of methanol with air in the presence of a silver catalyst, the step which comprises suppressing the formation of by-products by conducting the methanol to formaldehyde reaction in the presence of from 5 to 100 parts of sulfur per million parts of methanol, the sulfur being present in a compound of the group consisting of carbon disulfide, saturated alkyl sulfides, mercaptans and unsaturated alkyl, aryl, aralkyl, cyclic and alicyclic sulfides.

4. In a process for the production of formaldehyde by the oxidation and dehydrogenation of methanol with air and a silver catalyst, the step which comprises suppressing the formation of by-products during the oxidation and dehydrogenation reaction of the methanol to formaldehyde by the presence of from 20 to 30 parts of sulfur per million parts of methanol, the sulfur being present in a compond of the group consisting of carbon disulfide, saturated alkyl sulfides, mercaptans and unsaturated alkyl, aryl, aralkyl, cyclic and alicyclic sulfides.

5. In a process for the production of formaldehyde by the oxidation and dehydrogenation of methanol with air and a silver catalyst, the step which comprises suppressing the formation of by-products during the oxidation and dehydrogenation reaction of the methanol to formaldehyde by the presence of from 20 to 30 parts of sulfur, as carbon di-sulfide, per million parts of methanol.

WILLARD A. PAYNE.
WALTER E. VAIL.

REFERENCES CITED

The following references are of record in the file of this patent:

UNITED STATES PATENTS

| Number | Name | Date |
| --- | --- | --- |
| 1,895,528 | Taylor et al. | Jan. 31, 1933 |